(12) United States Patent
Christensen et al.

(10) Patent No.: US 7,957,371 B2
(45) Date of Patent: *Jun. 7, 2011

(54) LINEARLY EXPANDABLE BROADCAST ROUTER APPARATUS

(75) Inventors: Carl L. Christensen, South Jordan, UT (US); David Lynn Bytheway, Murray, UT (US); Mitchell T. Hayden, Syracuse, UT (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1015 days.

This patent is subject to a terminal disclaimer.

(21) Appl. No.: 10/518,211

(22) PCT Filed: Jun. 16, 2003

(86) PCT No.: PCT/US03/18848
§ 371 (c)(1),
(2), (4) Date: Dec. 16, 2004

(87) PCT Pub. No.: WO04/002072
PCT Pub. Date: Dec. 31, 2003

(65) Prior Publication Data
US 2005/0207428 A1  Sep. 22, 2005

Related U.S. Application Data

(60) Provisional application No. 60/390,358, filed on Jun. 21, 2002.

(51) Int. Cl.
*H04Q 11/00* (2006.01)
(52) U.S. Cl. ........ 370/362; 370/387; 370/400; 709/238; 326/41

(58) Field of Classification Search .................. 370/259, 370/366, 351, 401, 395.31, 219, 230, 352, 370/360, 362, 386–388; 348/40.11, 14.11; 709/238; 326/41
See application file for complete search history.

(56) References Cited

U.S. PATENT DOCUMENTS

| | | | | |
|---|---|---|---|---|
| 5,634,043 A | * | 5/1997 | Self et al. | 713/503 |
| 5,802,278 A | * | 9/1998 | Isfeld et al. | 370/401 |
| 6,040,811 A | * | 3/2000 | Malhi | 345/87 |

(Continued)

FOREIGN PATENT DOCUMENTS

EP  1 091 524 A2  4/2001

(Continued)

OTHER PUBLICATIONS

F.N. Tzeng et al. "Cost-Effective Switching Fabrics with Distributed Control for Scalable Routers", University of Louisiana, IEEE 2002, entire article.

(Continued)

*Primary Examiner* — Kwang B Yao
*Assistant Examiner* — Jeffrey M Rutkowski
(74) *Attorney, Agent, or Firm* — Arent Fox LLP (57) ABSTRACT

A linearly expandable router is comprised of first, second, third and fourth router components. First, second and third discrete links couple an input side of a routing engine of the first router component (102) to an input side of a routing engine of the second, third and fourth router components. Similarly, fourth and fifth discrete links couple the input side of the routing engine for the second router component to the input side of the routing engine of the third and fourth router components, respectively. Finally, a sixth discrete link couples the input side of the routing engine for the third router component to the input side of the router engine for the fourth router component.

7 Claims, 10 Drawing Sheets

U.S. PATENT DOCUMENTS

| | | | |
|---|---|---|---|
| 6,078,963 | A | 6/2000 | Civanlar et al. |
| 6,185,211 | B1 | 2/2001 | Nagatomo et al. |
| 6,373,838 | B1 * | 4/2002 | Law et al. ............ 370/352 |
| 6,430,179 | B1 * | 8/2002 | Meyer ................ 370/360 |
| 6,496,510 | B1 | 12/2002 | Tsukakoshi et al. |
| 6,577,634 | B1 * | 6/2003 | Tsukakoshi et al. ..... 370/395.31 |
| 6,594,229 | B1 * | 7/2003 | Gregorat ............ 370/219 |
| 6,680,939 | B1 * | 1/2004 | Lydon et al. .......... 370/366 |
| 6,693,901 | B1 | 2/2004 | Byers et al. |
| 6,765,921 | B1 * | 7/2004 | Stacey et al. ......... 370/401 |
| 6,781,408 | B1 * | 8/2004 | Langhammer ......... 326/41 |
| 7,043,596 | B2 * | 5/2006 | McWilliams et al. ..... 370/351 |
| 7,167,479 | B2 * | 1/2007 | Christensen et al. ..... 370/401 |
| 2002/0118682 | A1 * | 8/2002 | Choe ............ 370/395.31 |
| 2002/0150093 | A1 | 10/2002 | Ott et al. |
| 2003/0021232 | A1 | 1/2003 | Duplaix et al. |
| 2003/0067925 | A1 | 4/2003 | Choe et al. |
| 2003/0099247 | A1 | 5/2003 | Toutant et al. |
| 2003/0161293 | A1 * | 8/2003 | Kamachi ............ 370/351 |
| 2003/0223361 | A1 * | 12/2003 | Hussain et al. ......... 370/230 |
| 2006/0120342 | A1 * | 6/2006 | Christensen et al. ..... 370/351 |

FOREIGN PATENT DOCUMENTS

| | | |
|---|---|---|
| JP | 10-322357 | 12/1998 |
| JP | 2001-257689 | 9/2001 |
| JP | 2001-356847 | 12/2001 |
| JP | 2008-251173 | 10/2008 |

OTHER PUBLICATIONS

Search Report Dated Sep. 16, 2003.

Chan, Henry C.B.: "Cost Performance Optimization in IP Switched-Routers", 1999 IEEE Pacific Rim Conference on Communications, Computers and Signal Processing Communication, Issue Date: 1999, pp. 345-348.

Pattavina, Achille: "Switching Theory", Non-Blocking Networks published by John Wiley and Sons Limited. (pp. 127-128) Jul. 1998.

* cited by examiner

LINEARLY EXPANDABLE BROADCAST ROUTER APPARATUS

CROSS REFERENCE

This application claims the benefit, under 35 U.S.C. §365 of International Application PCT/US03/18848, filed Jun. 16, 2003, which was published in accordance with PCT Article 21(2) on Dec. 21, 2003 in English and which claims the benefit of U.S. provisional patent application No. 60/390, 358, filed Jun. 21, 2002.

This application is also related to co-pending U.S. patent application Ser. No. PCT/US03/19154, Ser. No. PCT/US03/19392, Ser. No. PCT/US03/19390, Ser. No. PCT/US03/19389, Ser. No. PCT/US03/18821, Ser. No. PCT/US03/19600, Ser. No. PCT/US03/19016, Ser. No. PCT/US03/19421, Ser. No. PCT/US03/19114, Ser. No. PCT/US03/19391, Ser. No. PCT/US03/19015, and Ser. No. 60/390,347, all of which were assigned to the Assignee of the present application and hereby incorporated by reference as if reproduced in their entirety.

FIELD OF THE INVENTION

The present invention relates to broadcast routers and, more particularly, to a linearly expandable broadcast router having plural routing engines arranged in a fully connected topology.

BACKGROUND OF THE INVENTION

A broadcast router allows each one of a plurality of outputs therefrom to be assigned the signal from any one of a plurality of inputs thereto. For example, an N×M broadcast router has N inputs and M outputs coupled together by a routing engine which allows any one of the N inputs to be applied to each one of the M outputs. Oftentimes, it is desirable to construct larger broadcast routers, for example a 4N×4M broadcast router. One solution to building larger broadcast routers was to use the smaller broadcast router as a building block of the proposed larger broadcast router. This technique, however, resulted in the exponential growth of the proposed larger broadcast routers. For example, to construct a 4N×4M broadcast router required 16 N×M broadcast routers. As a result, large broadcast routers constructed in this manner were often both expensive and unwieldy. Linearly expandable broadcast routers overcame the problems of geometric expansion. However, conventionally configured linearly expandable broadcast routers suffer from other types of deficiencies. For example, oftentimes, they are susceptible to catastrophic failures which cause plural broadcast router components to fail in response to a single break.

SUMMARY OF THE INVENTION

A linearly expandable broadcast router is comprised of at least three routing engines, each having input and output sides, arranged in a fully connected topology. In the embodiment of the invention comprised of first, second and third routing engines, a first discrete link couples the input side of the first routing engine to the input side of the second routing engine. Similarly, a second discrete link couples the input side of the first routing engine to the input side of the third routing engine and a third discrete link couples the input side of the second routing engine to the input side of the third routing engine.

DETAILED DESCRIPTION

Figure 1:
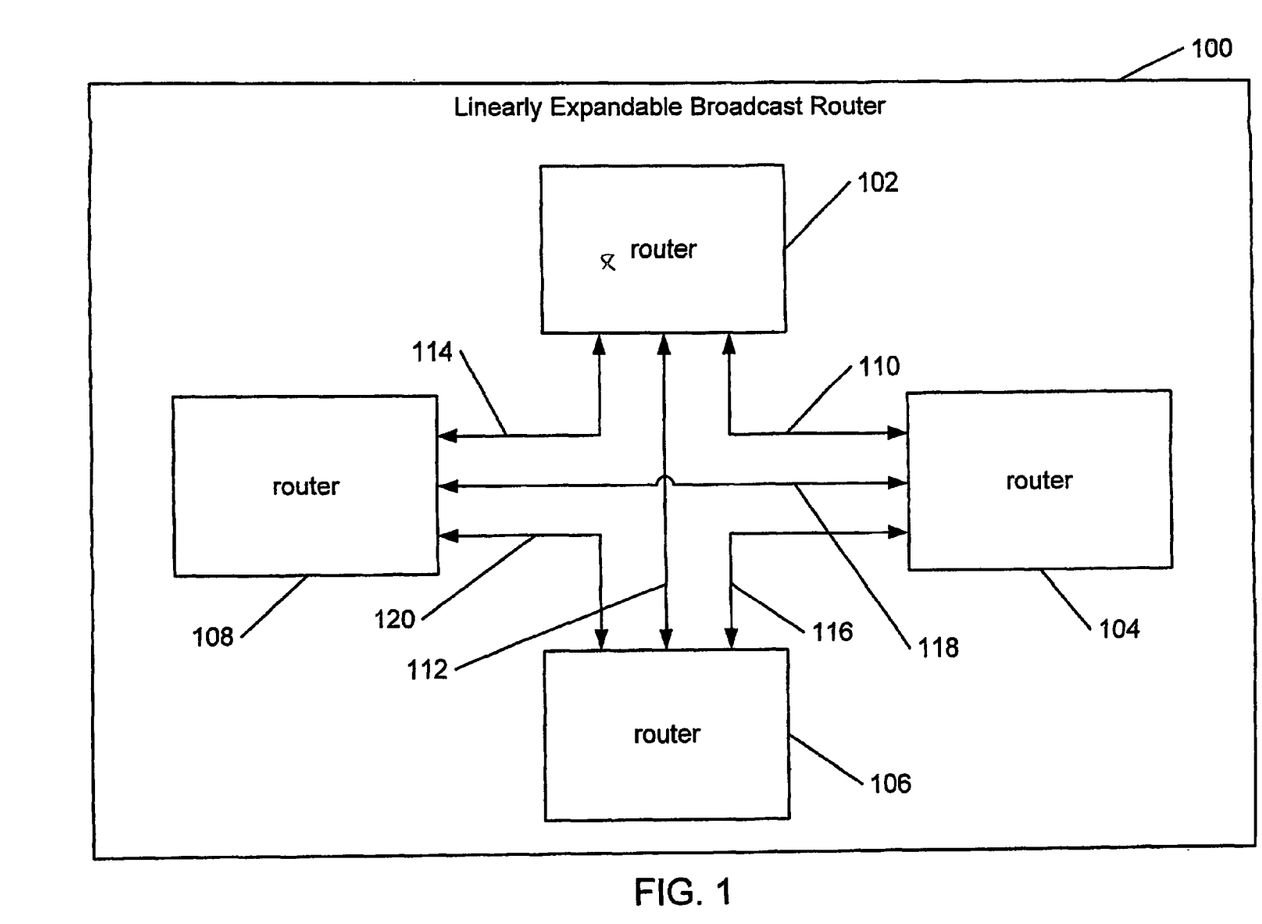
FIG. 1 is a block diagram of a linearly expandable broadcast router constructed in accordance with the teachings of the present invention.
Figure 2A:
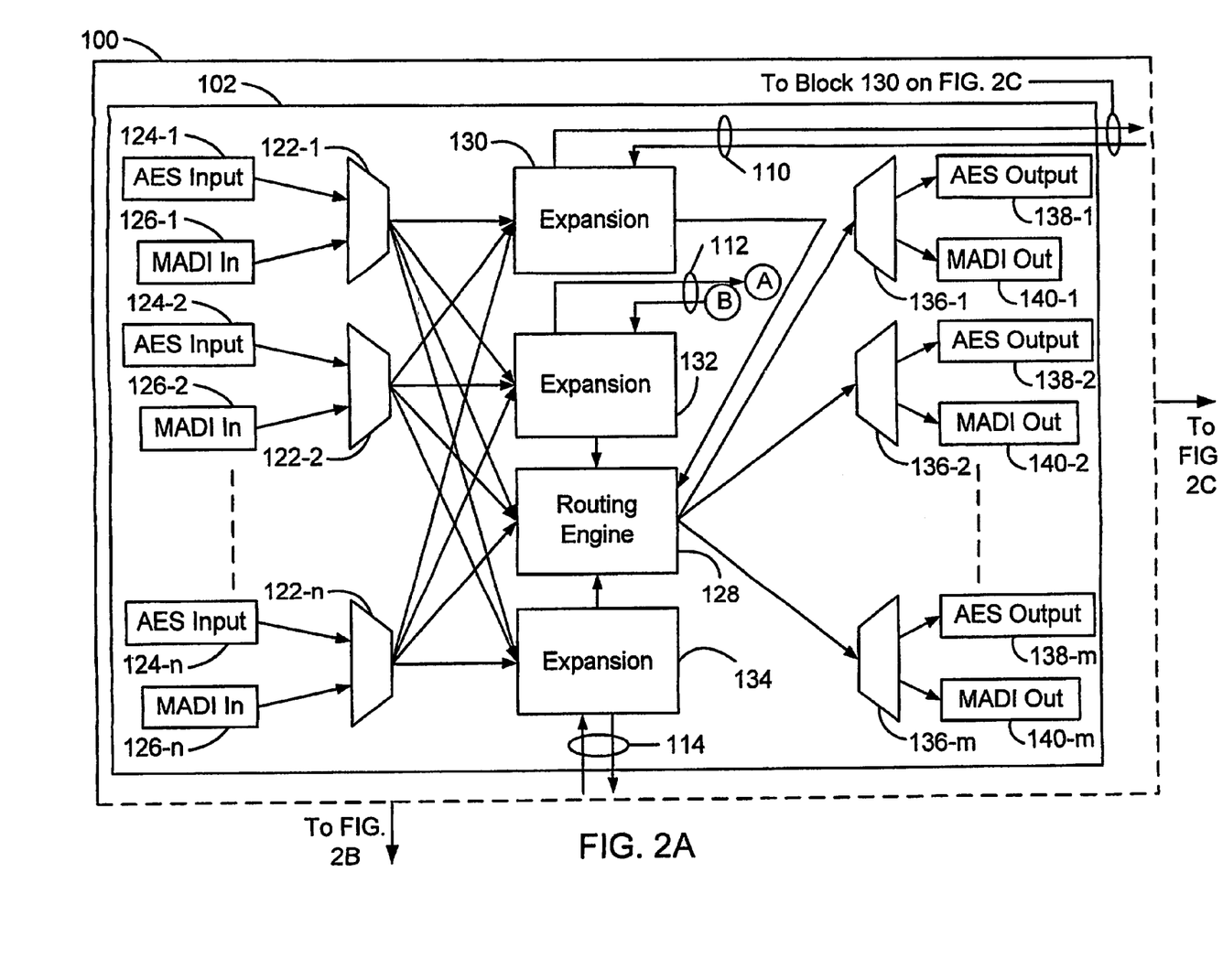
FIG. 2 is an expanded block diagram of a first embodiment of the linearly expandable broadcast router of FIG. 1.
Figure 2B:
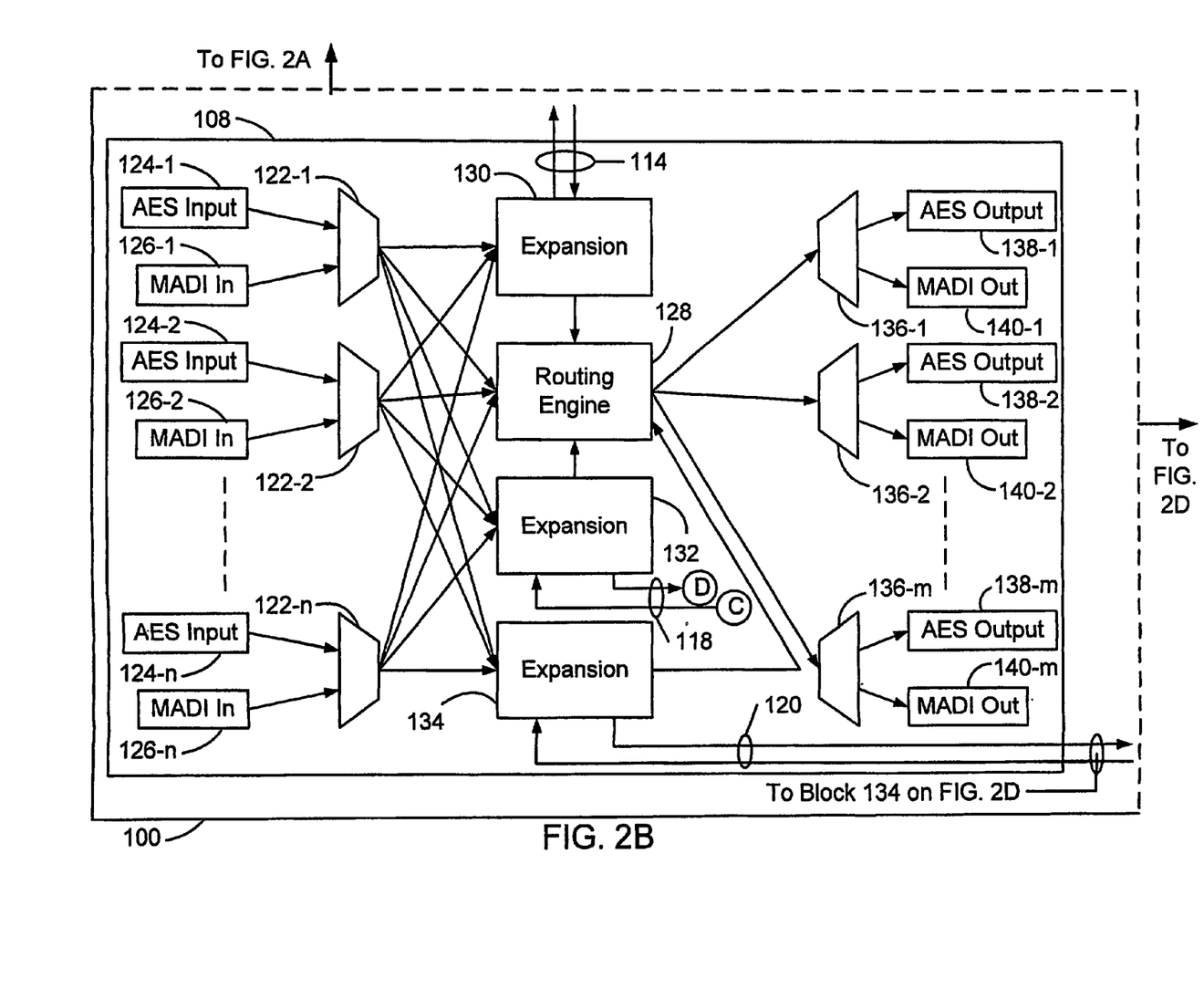
Figure 2C:
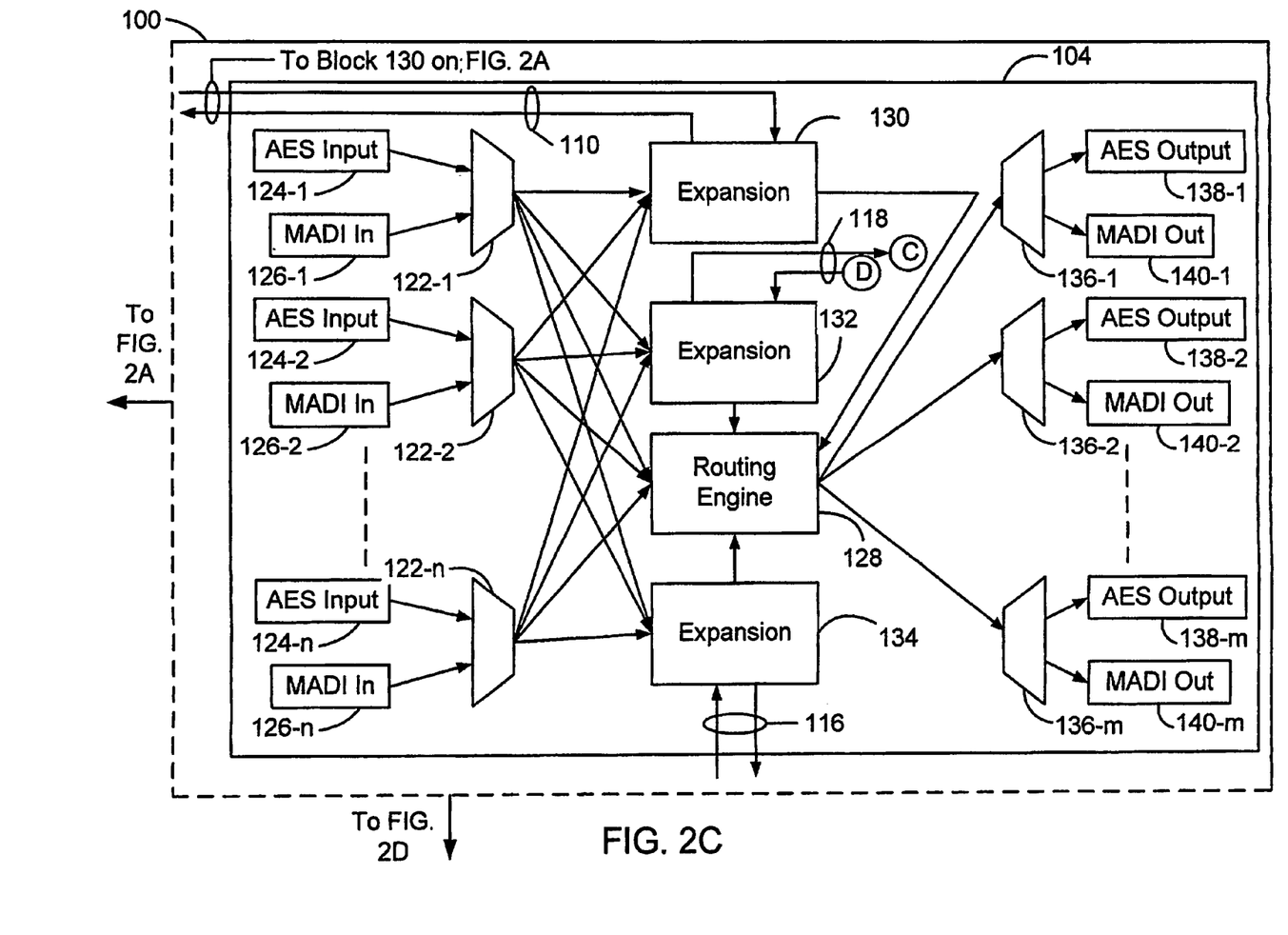
Figure 2D:
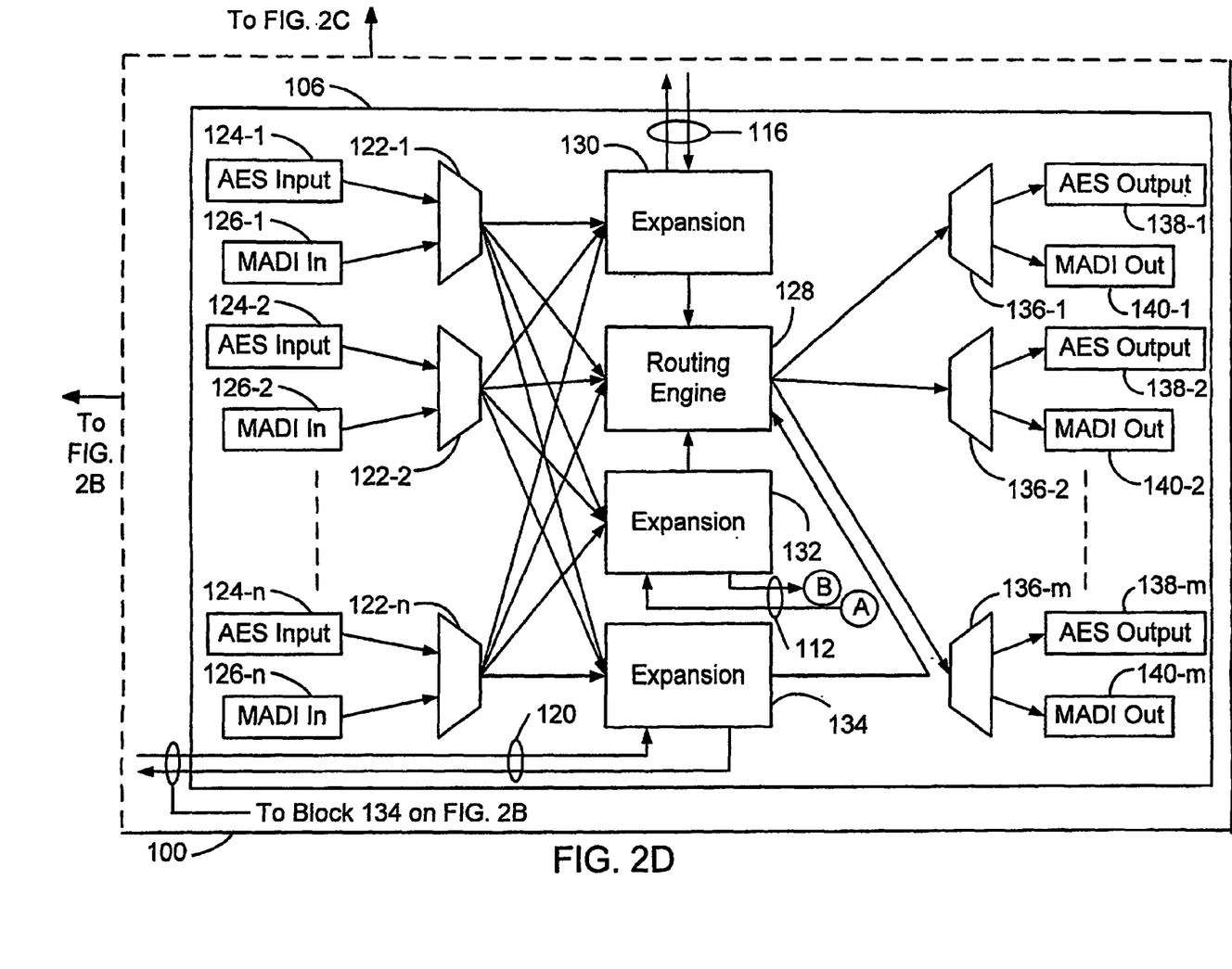

Referring first to FIG. 1, a linearly expandable broadcast router 100 constructed in accordance with the teachings of the present invention will now be described in greater detail. As may now be seen, the linearly expandable broadcast router 100 is comprised of plural broadcast router components coupled to one another to form the larger linearly expandable broadcast router 100. Each broadcast router component is, of course, a discrete router having N inputs, M outputs and a routing engine, for example, switching logic, for selectively connecting any one of the M outputs to any one of the N inputs. As disclosed herein, each of the broadcast router components are N×M sized broadcast routers. However, it is fully contemplated that the linearly expandable broadcast router 100 could instead be constructed of broadcast router components of different sizes relative to one another.

As further disclosed herein, the linearly expandable broadcast router 100 is formed by coupling together first, second, third and fourth broadcast router components 102, 104, 106 and 108. Of course, the present disclosure of the linearly expandable broadcast router 100 as being formed of four broadcast routers is purely by way of example. Accordingly, it should be clearly understood that a linearly expandable broadcast router constructed in accordance with the teachings of the present invention may be formed using various other numbers of broadcast router components as long as the total number of broadcast router components which collectively form the linearly expandable broadcast router is equal to or greater than three. The first, second, third and fourth broadcast router components 102, 104, 106 and 108 which, when interconnected in the manner disclosed herein, collectively form the linearly expandable broadcast router 100 may either be housed together in a common chassis as illustrated in FIG. 1 or, if desired, housed in separate chassis. While, as previously set forth, the broadcast router components 102, 104, 106 and 108 may have different sizes relative to one another or, in the alternative, may all have the same N×M size, one size that has proven suitable for the uses contemplated herein is 256×256. Furthermore, a suitable configuration for the linear expandable broadcast router 100 would be to couple five broadcast router components, each sized at 256×256, thereby resulting in a 1,280×1,280 broadcast router.

The first, second, third and fourth broadcast router components 102, 104, 106 and 108 of the linearly expandable broadcast router 100 are coupled together in a fully connected topology. When the broadcast router components of a linearly expandable broadcast router are arranged in a fully connected topology, each broadcast router component is connected to each and every one of the other broadcast router components by a discrete link. In other words, first, second and third bi-directional links 110, 112 and 114 couples the first broadcast router component 102 to the second, third and fourth broadcast router components 104, 106 and 108, respectively. Additionally, fourth and fifth bi-directional links 116 and 118 couple the second broadcast router component 104 to the third and fourth broadcast router components 106 and 108, respectively. Finally, a sixth bi-directional link 120 couples the third broadcast router component 106 to the fourth broadcast router component 108. Variously, the bi-directional links 110 through 120 may be formed of copper wire, optical fiber or another transmission medium deemed suitable for the exchange of digital signals. Of course, rather than the single bi-directional links between pairs of broadcast router components illustrated in FIG. 1, in an alternate embodiment of the invention, it is contemplated that the pairs of broadcast router components may instead be coupled together by first and second uni-directional links. Such an alternate configuration is illustrated in FIG. 2.

Turning now to FIG. 2, the linearly expandable broadcast router 100 will now be described in greater detail. As may now be seen, each one of the first, second, third and fourth broadcast router components 102, 104, 106 and 108 has N selectors 122-1 through 122-N arranged such that the output of each one of the selectors provides one of the N inputs to the input side of the routing engine for that broadcast router component 102, 104, 106, 108. As disclosed herein, each one of the selectors 122-1 through 122-N is a 2:1 selector circuit having, as a first input 124-1 through 124-N, respectively, an input digital audio data stream conforming to the Audio Engineering Society-3 ("AES-3") standard and, as a second input 126-1 through 126-N, respectively, an input digital audio data stream conforming to the multichannel digital audio interface ("MADI") standard set forth in the AES-10 standard. In this regard, it should be noted that a MADI input digital audio data stream may contain up to 32 AES digital audio data streams and that, each one of the second inputs 126-1 through 126-N contains a single AES digital audio data stream which had previously been extracted from a MADI input digital audio data stream by extraction circuitry (not shown). Thus, the output of each one of the selector circuits 122-1 through 122-N provides one of N input digital audio data streams to the input side of the routing engine for that broadcast router component 102, 104, 106, 108. Each one of the selector circuits 122-1 through 122-N further includes a control input (not shown) for selecting between the AES input digital audio data streams provided at the first inputs 124-1 through 124-N and MADI-extracted AES input digital audio data streams provided at the second inputs 126-1 through 126-N. Of course, it should be readily appreciated that other types of input data streams other than the input digital audio data streams disclosed herein are equally suitable for use with the broadcast router components 102, 104, 106 and 108. For example, it is contemplated that the broadcast router components 102, 104, 106 and 108 may instead be used with other low bandwidth digital signals such as compressed video and data signals. It is further contemplated that, with minor modifications, for example, faster hardware, the broadcast router components 102, 104, 106 and 108 may be used with non-compressed digital video signals.

For each of the first, second, third and fourth broadcast router components 102, 104, 106 and 108, the selected input digital audio data stream output each one of the selector circuits 122-1 through 122-N is fed to an input side of a routing engine 128, a first expansion port 130, a second expansion port 132 and a third expansion port 134. Residing within the routing engine 128 is switching means for assigning any one of the input digital audio data signals received on the input side of the routing engine 128 to any one of the output lines on an output side of the routing engine 128. Variously, it is contemplated that the routing engine 128 may be embodied in software, for example, as a series of instructions; hardware, for example, as a series of logic circuits; or a combination thereof. In a broad sense, each one of the first, second and third expansion ports 130, 132 and 134 is comprised of a memory subsystem in which: (1) input digital audio data streams received from the selector circuits 122-1 through 122-N of a first broadcast router component; and (2) input digital audio data streams received from an expansion port of a second broadcast router component may be buffered before transfer to their final destination and a processor subsystem for controlling: (1) the transfer of the input digital audio data streams received from the selector circuits 122-1 through 122-N to the expansion port of the second broadcast router component; and (2) the transfer of the input digital audio data streams received from the expansion port of the second broadcast router component to the input side of the routing engine 128 of the first broadcast router component.

Figure 3:
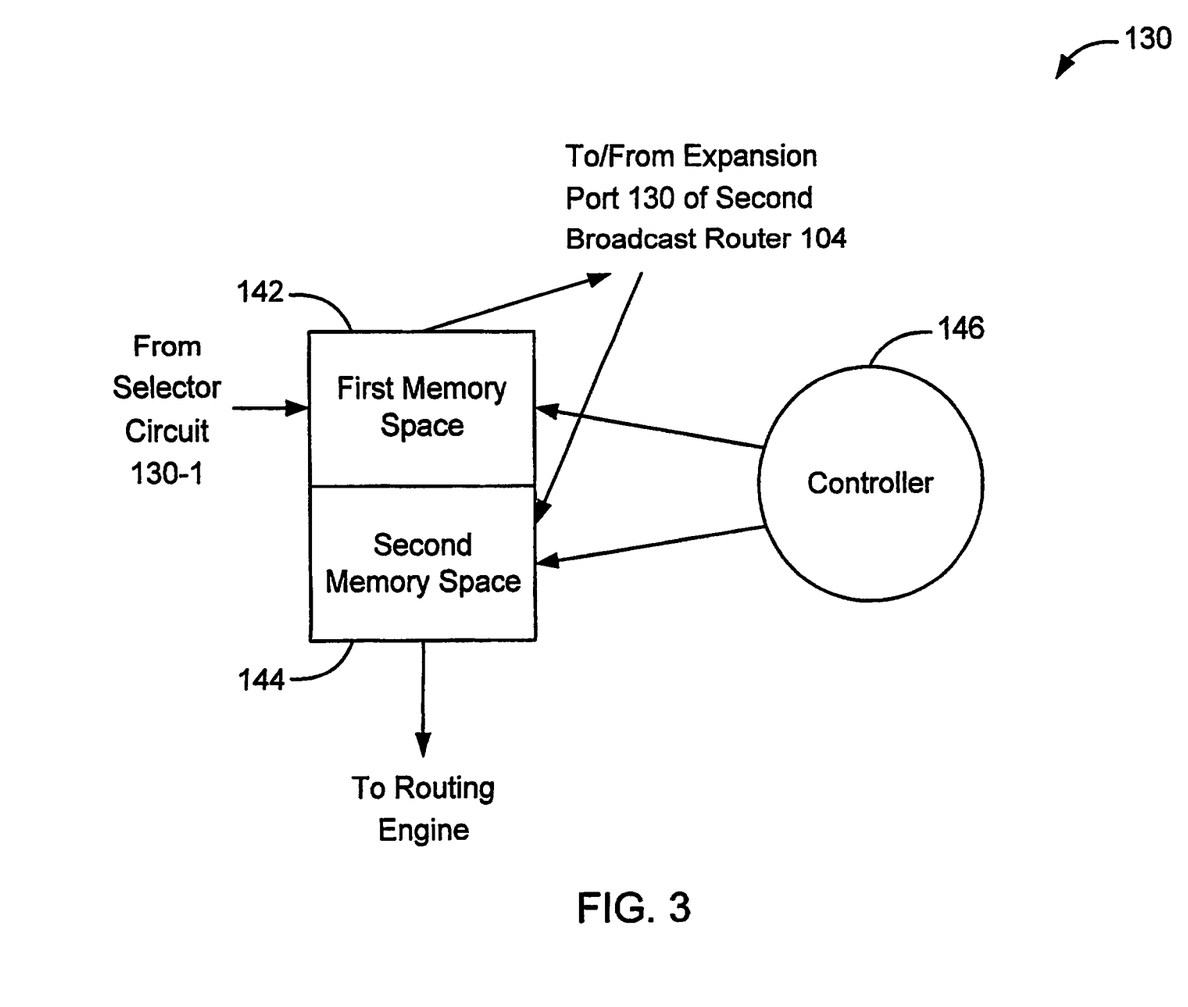
FIG. 3 is an expanded block diagram of an expansion port of a broadcast router component of the linearly expandable broadcast router of FIG. 2.
Figure 4A:
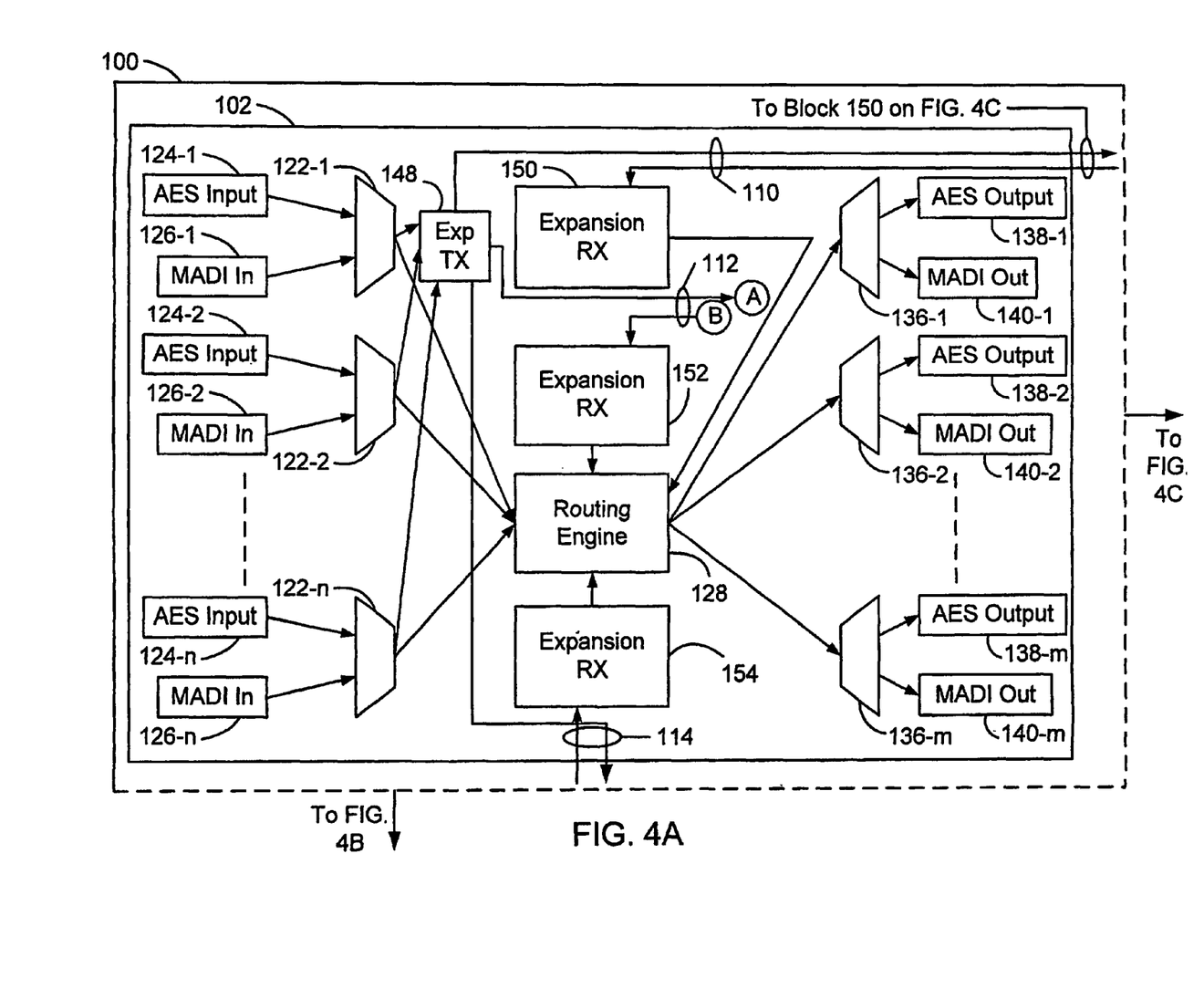
FIG. 4 is an expanded block diagram of a second, alternate, embodiment of the linearly expandable broadcast router of FIG. 1.
Figure 4B:
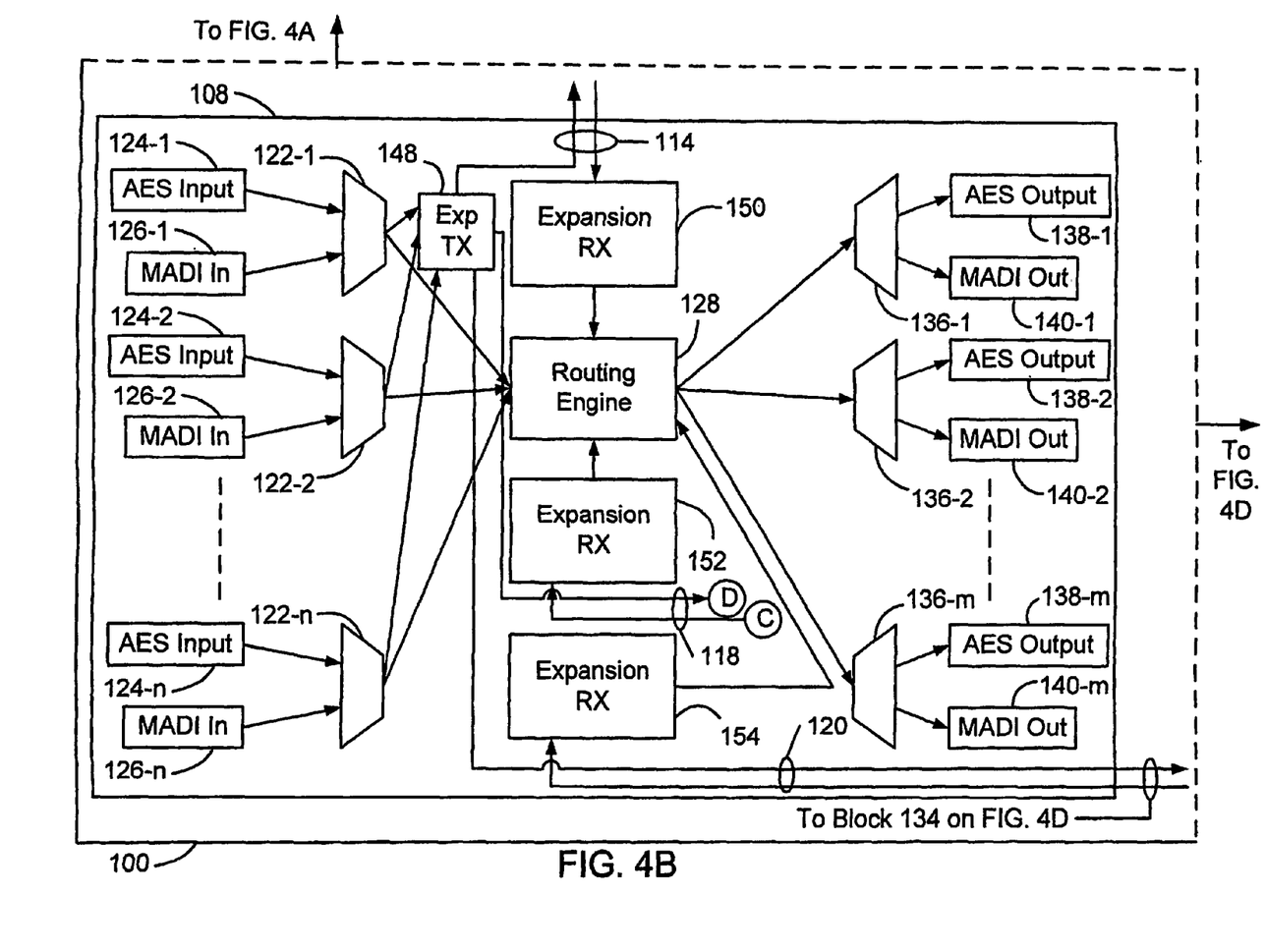
Figure 4C:
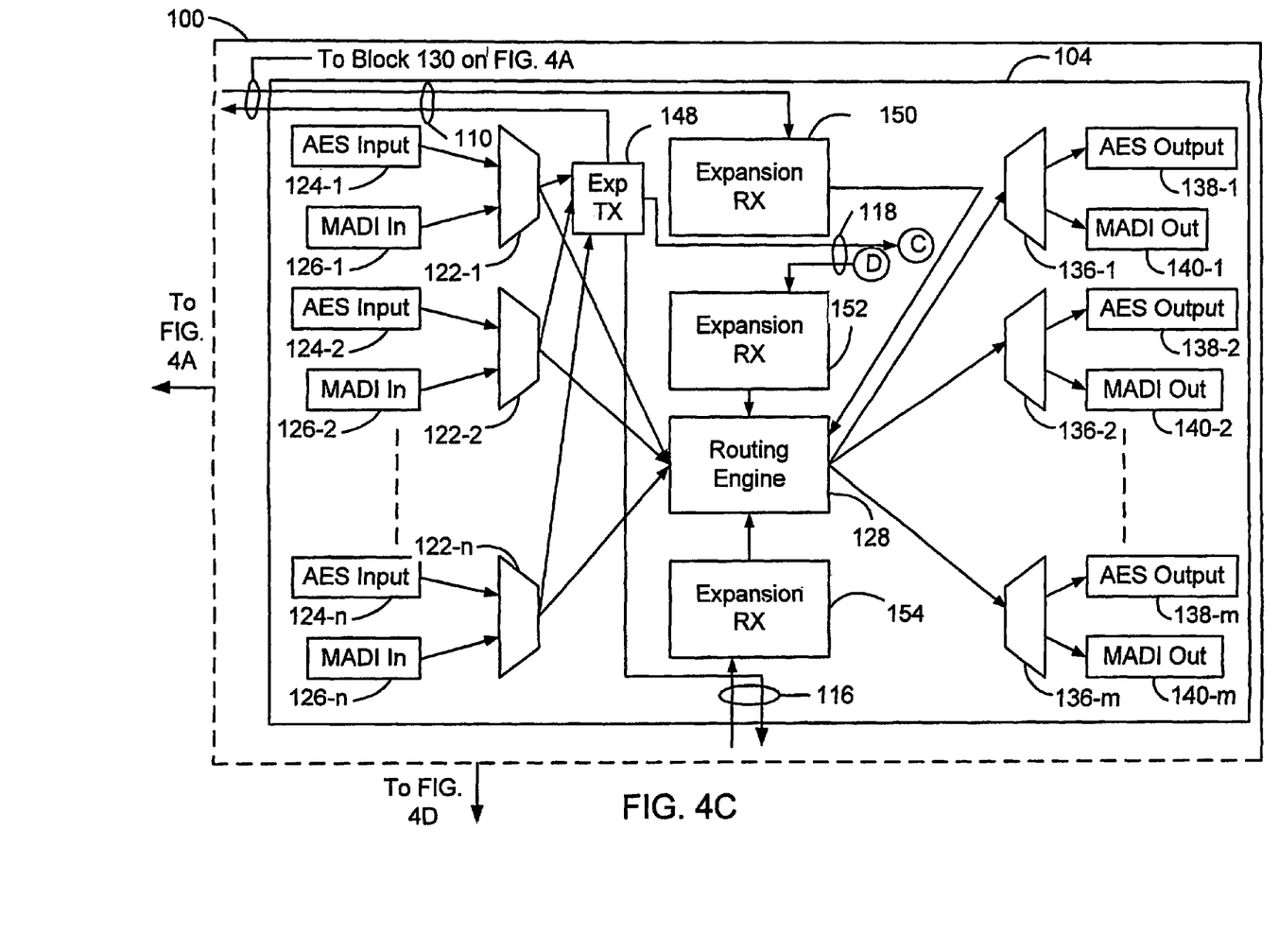
Figure 4D:
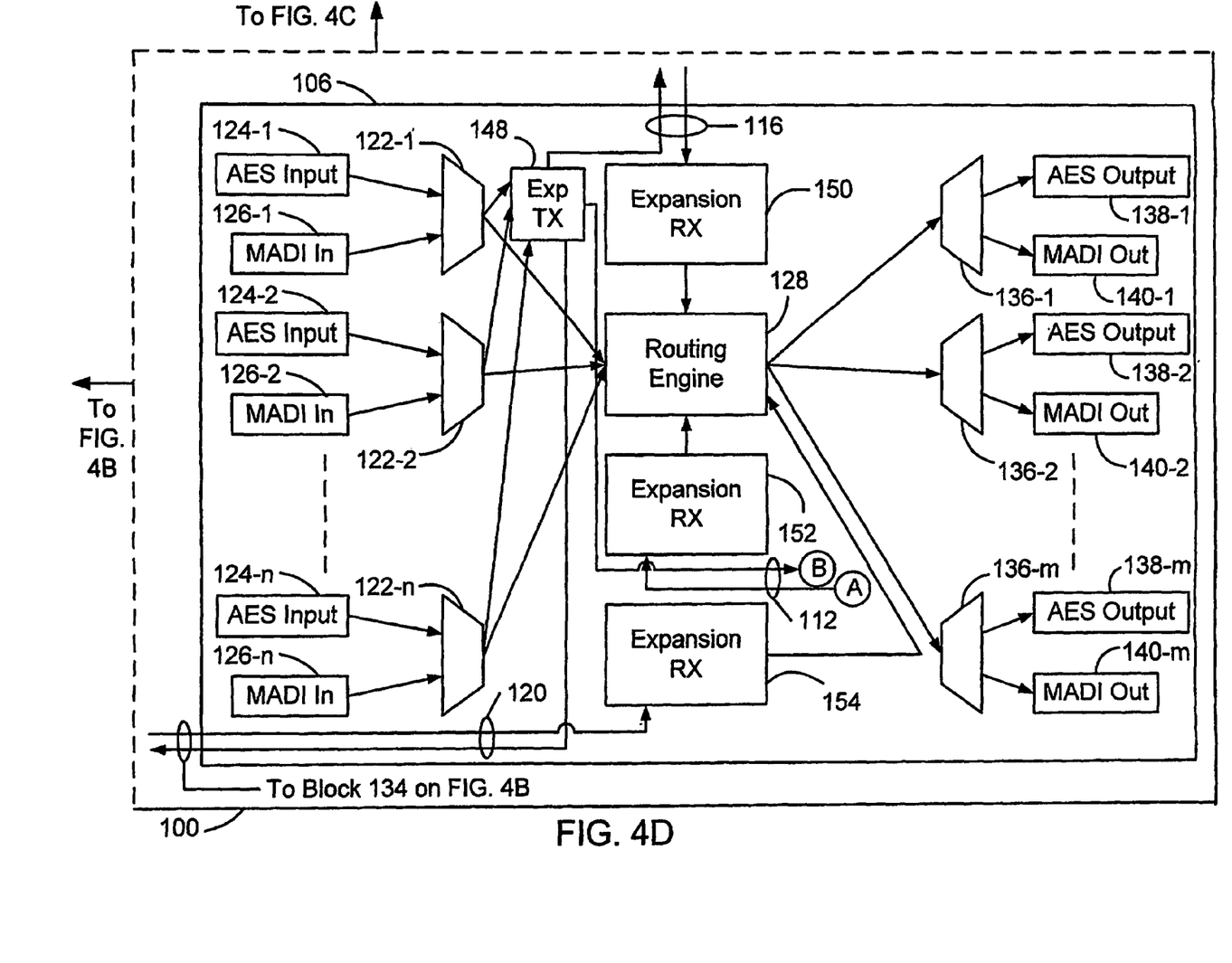

Turning momentarily to FIG. 3, the first, second and third expansion ports 130, 132 and 134 will now be described in greater detail. In this regard, it should be noted that, while, the first expansion ports 130 of the first broadcast router component 102 is described and illustrated herein, as the second and third expansion ports 132 and 134 of the first broadcast router component and the first, second and third expansion ports 130, 132 and 134 of the second, third and fourth broadcast router components 104, 106 and 108 are similarly configured, the description that follows is equally applicable to those expansion ports as well. Accordingly, as may be seen in FIG. 3, the first expansion port 130 includes a first memory space 142 and a second memory space 144. Variously, the first and second memory spaces 142 and 144 may be comprised of first and second discrete memory devices or, as shown in FIG. 3, may be comprised of first and second discrete address spaces within a common memory device.

The expansion port 130 further includes control circuitry 146, for example, a controller, for controlling the transfer of input digital audio data streams, received by the expansion port 130, to their final destinations. More specifically, the input digital audio data stream output the selector circuit coupled to the expansion port 130, for example, the selector circuit 130-1, is temporarily stored, or buffered, in the first memory space 142. The controller 146 then transfers the digital audio data stored in the first memory space 142 to the second memory space 144 of the expansion port 130 of the second broadcast router component 104. Similarly, the digital audio data stored in the first memory space 142 of the expansion port 130 of the second broadcast router component 104 is transferred to the second memory space 144. From the second memory space 144, the controller 146 transfers the digital audio data received from the second broadcast router component 104 to the input side of the routing engine 128 for the first broadcast router component 102. Of course, the configuration and operation of the expansion port 130 are but one device and associated process suitable for the transfer of digital audio data and it is fully contemplated that other devices and/or processes involving buffering and/or first-in-first-out ("FIFO") schemes are equally suitable for the purposes disclosed herein.

As a discrete input digital audio data stream is output each of the selectors 122-1 through 122-N for each of the first, second, third and fourth broadcast router components 102, 104, 106 and 108, the input digital audio data streams fed to each one of the input side of the routing engine 128, the first expansion port 130, the second expansion port 132 and the third expansion port 134 of the first broadcast router component 102 are audio data input streams 1 through N. Similarly, the input digital audio data streams fed to each one of the input side of the routing engine 128, the first expansion port 130, the second expansion port 132 and the third expansion port 134 of the second broadcast router component 104 are input digital audio data streams N+1 through 2N; the input digital audio data streams fed to each one of the input side of the routing engine 128, the first expansion port 130, the second expansion port 132 and the third expansion port 134 of the third broadcast router component 106 are input digital audio data streams 2N+1 through 3N; and the input digital audio data streams fed to each one of the input side of the routing engine 128, the first expansion port 130, the second expansion port 132 and the third expansion port 134 of the fourth broadcast router component 108 are input digital audio data streams 3N+1 through 4N.

To function as a 4N×4M broadcast router, the routing engine 128 of each one of the first, second, third and fourth broadcast router components 102, 104, 106 and 108 must have all of the input digital audio data streams 1 through 4N provided as inputs to the input side thereof. For the first broadcast router component 102, the input digital audio data streams 1 through N are provided to the input side of the routing engine 128 directly. The input digital audio data streams 1 through N input the expansion ports 130, 132 and 134, on the other hand, are transferred to the expansion port 130 of the second broadcast router component 104 over the link 110, the expansion port 132 of the third broadcast router component 106 over the link 112 and the expansion port 130 of the fourth broadcast router component 108 over the link 114, respectively. From the expansion port 130 of the second broadcast router component 104, the expansion port 132 of the third broadcast router component 106 and the expansion port 130 of the fourth broadcast router component 108, the input digital audio data streams 1 through N are transferred to the input side of the routing engines 128 of the second, third and fourth broadcast router components 104, 106 and 108, respectively.

Similarly, for the second broadcast router component 104, the input digital audio data streams N+1 through 2N are provided to the input side of the routing engine 128 directly. The input digital audio data streams N+1 through 2N input the expansion ports 130, 132 and 134, on the other hand, are transferred to the expansion port 130 of the first broadcast router component 102 over the link 110, the expansion port 132 of the fourth broadcast router component 108 over the link 118 and the expansion port 130 of the third broadcast router component 106 over the link 116, respectively. From the expansion port 130 of the first broadcast router component 102, the expansion port 132 of the fourth broadcast router component 108 and the expansion port 130 of the third broadcast router component 106, the input digital audio data streams N+1 through 2N are transferred to the input side of the routing engines 128 of the first, fourth and third broadcast router components 104, 108 and 106.

For the third broadcast router component 106, the input digital audio data streams 2N+1 through 3N are provided to the input side of the routing engine 128 directly. The input digital audio data streams 2N+1 through 3N input the expansion ports 130, 132 and 134, on the other hand, are transferred to the expansion port 134 of the second broadcast router component 104 over the link 116, the expansion port 132 of the first broadcast router component 102 over the link 112 and the expansion port 134 of the fourth broadcast router component 108 over the link 120, respectively. From the expansion port 134 of the second broadcast router component 104, the expansion port 132 of the first broadcast router component 102 and the expansion port 134 of the fourth broadcast router component 108, the input digital audio data streams 2N+1 through 3N are transferred to the input side of the routing engines 128 of the second, first and fourth broadcast router components 104, 102 and 108.

Finally, for the fourth broadcast router component 108, the input digital audio data streams 3N+1 through 4N are provided to the input side of the routing engine 128 directly. The input digital audio data streams 3N+1 through 4N input the expansion ports 130, 132 and 134, on the other hand, are transferred to the expansion port 134 of the first broadcast router component 102 over the link 114, the expansion port 132 of the second broadcast router component 104 over the link 118 and the expansion port 134 of the fourth broadcast router component 108 over the link 120, respectively. From the expansion port 134 of the first broadcast router component 102, the expansion port 132 of the second broadcast router component 104 and the expansion port 134 of the fourth broadcast router component 108, the input digital audio data streams 3N+1 through 4N are transferred to the input side of the routing engines 128 of the first, second and fourth broadcast router components 102, 104 and 108. In this manner, the routing engine 128 of each one of the first, second, third and fourth broadcast router components 102, 104, 106 and 108 receive, at the input side thereof, the input digital audio data streams 1 through 4N.

Within the routing engine 128 of the first broadcast router component 102, switch logic or other switching means enables any one of the input digital audio data streams 1 through 4n to be applied to any of the 1 through m outputs thereof. Similarly, switch logic or other switching means within the routing engine 128 of the second, third and fourth router components 104, 106 and 108 enables any one of the input digital audio data streams 1 through 4N to be applied to any of the M+1 through 2M, 2M+1 through 3M and 3M+1 through 4M outputs thereof, respectively. The switching logic or other switching means within the routing engines 128 is controlled by one or more control inputs which originate at a controller (not shown) or other control circuitry for the linearly expandable broadcast router 100.

Each one of the 1 through M, M+1 through 2M, 2M+1 through 3M and 3M+1 through 4M digital audio data streams output the output side of the routing engines 128 of the first, second, third and fourth broadcast router components 102, 104, 106 and 108, respectively, is propagated to a corresponding selector 136-1 through 136-M. As disclosed herein, each one of the selectors 136-1 through 136-M is a 1:2 selector circuit having an input coupled to a corresponding output of the routing engine 128, a first output 138-1 through 138-M configured to transmit an output digital audio data stream conforming to the AES-3 standard and a second output 140-1 through 140-M configured to transmit an output digital audio data stream conforming to the MADI standard. Of course, since, as previously mentioned, a MADI input digital audio data stream may contain up to 32 AES digital audio data streams, each one of the second outputs 140-1 through 140-M would actually contain a single AES digital audio stream which would then be combined with other AES digital audio streams by combining circuitry (not shown) to form a MADI output digital audio data stream. Each one of the selector circuits 136-1 through 136-M further includes a control input (also not shown) for selecting between the AES-3 and MADI output digital audio data streams.

In an alternate embodiment of the invention not shown in the drawings, the selector circuits 122-1 through 122-N and 136-1 through 136-M may be omitted if the broadcast router components 102, 104, 106 and 108 are instead configured to handle input digital audio data streams conforming to a single standard, for example, the AES-3 standard, the MADI standard or another standard not specifically recited herein. In accordance with this configuration, however, each of the N input digital audio data streams for each of the first, second, third and fourth broadcast router components 102, 104, 106 and 108 are fed directly to the routing engine 128, first expansion port 130, second expansion port 132 and third expansion port 134. In further accordance with this configuration, each of the M output digital audio data streams output the routing engine 128 for each of the first, second, third and fourth broadcast router components 102, 104, 106 and 108 are outputs of the linearly expandable broadcast router 100 itself.

Referring next to FIG. 4, an alternate embodiment of the linearly expandable broadcast router 100 will now be described in greater detail. As may now be seen, for each of the first, second, third and fourth broadcast router components 102, 104, 106 and 108, the first expansion port 130, the second expansion port 132 and the third expansion port 134 have been removed in favor of a transmitting ("TX") expansion port 148, a first receiving expansion port 150, a second receiving expansion port 152 and a third receiving expansion port 154. By the term "transmitting" expansion port, it is intended to refer to an expansion port from which data is transmitted to selected destinations, here, plural receiving expansion port. Similarly, by the term "receiving" expansion port, it is intended to refer to an expansion port which receives data from a transmitting expansion port. In a broad sense, each transmitting expansion port 148 of a given broadcast router component is comprised of a memory subsystem in which input digital audio data streams received from the selector circuits 122-1 through 122-N are buffered before transfer to plural destinations and a processor subsystem for controlling the transfer of the input digital audio data streams received from the selector circuits 122-1 through 122-N to a receiving expansion port of each of the other broadcast router components. Conversely, each one of the first, second and third receiving expansion ports 150, 152 and 154 of a given broadcast router component are, in a broad sense, comprised of a memory subsystem in which input digital audio data streams received from a transmitting expansion port of another broadcast router component are buffered before transfer to their destination and a processor subsystem for controlling the transfer of the input digital audio data streams received from the transmitting expansion port of the other broadcast router component to inputs of the routing engine of the broadcast router component.

For each of the first, second, third and fourth broadcast router components 102, 104, 106 and 108, the selected input digital audio data stream output each one of the selector circuits 122-1 through 122-N is fed to the input side of the routing engine 128 and to the transmission expansion port 148. As a discrete input digital audio data stream is output each of the selectors 122-1 through 122-N for each of the first, second, third and fourth broadcast router components 102, 104, 106 and 108, the input digital audio data streams fed to each one of the input side of the routing engine 128 and the transmission expansion port 148 of the first broadcast router component 102 are audio data input streams 1 through N. Similarly, the input digital audio data streams fed to each one of the input side of the routing engine 128 and the transmission expansion port 148 of the second broadcast router component 104 are input digital audio data streams N+1 through 2N; the input digital audio data streams fed to each one of the input side of the routing engine 128 and the transmission expansion port 148 of the third broadcast router component 106 are input digital audio data streams 2N+1 through 3N; and the input digital audio data streams fed to each one of the input side of the routing engine 128 and the transmission expansion port 148 of the fourth broadcast router component 108 are input digital audio data streams 3N+1 through 4N.

As before, to function as a 4N×4M broadcast router, the routing engine 128 of each one of the first, second, third and fourth broadcast router components 102, 104, 106 and 108 must have all of the input digital audio data streams 1 through 4N provided as inputs to the input side thereof. For the first broadcast router component 102, the input digital audio data streams 1 through N are provided to the input side of the routing engine 128 directly. The input digital audio data streams 1 through N input the transmission expansion ports 148, on the other hand, is transferred to the first receiving expansion port 150 of the second broadcast router component 104 over the link 110, the second receiving expansion port 152 of the third broadcast router component 106 over the link 112 and the first receiving expansion port 150 of the fourth broadcast router component 108 over the link 114, respectively. From the first receiving expansion port 150 of the second broadcast router component 104, the second receiving expansion port 152 of the third broadcast router component 106 and the first receiving expansion port 150 of the fourth broadcast router component 108, the input digital audio data streams 1 through N are transferred to the input side of the routing engines 128 of the second, third and fourth broadcast router components 104, 106 and 108, respectively.

Similarly, for the second broadcast router component 104, the input digital audio data streams N+1 through 2N are provided to the input side of the routing engine 128 directly. The input digital audio data streams N+1 through 2N input the transmission expansion port 148, on the other hand, is transferred to the first receiving expansion port 150 of the first broadcast router component 102 over the link 110, the first expansion port 150 of the third broadcast router component 106 over the link 116 and the second receiving expansion port 152 of the third broadcast router component 106 over the link 118, respectively. From the first receiving expansion port 150 of the second broadcast router component 104, the first receiving expansion port 150 of the third broadcast router component 106 and the second receiving expansion port 152 of the fourth broadcast router component 108, the input digital audio data streams N+1 through 2N are transferred to the input side of the routing engines 128 of the second, third and fourth broadcast router components 104, 106 and 108.

For the third broadcast router component 106, the input digital audio data streams 2N+1 through 3N are provided to the input side of the routing engine 128 directly. The input digital audio data streams 2N+1 through 3N input the transmission expansion port 148, on the other hand, are transferred to the second receiving expansion port 152 of the first broadcast router component 102 over the link 112, the third receiving expansion port 154 of the second broadcast router component 104 over the link 116 and the third receiving expansion port 154 of the fourth broadcast router component 108 over the link 120, respectively. From the second receiving expansion port 152 of the first broadcast router component 102, the third receiving expansion port 154 of the second broadcast router component 104 and the third receiving expansion port 154 of the fourth broadcast router component 108, the input digital audio data streams 2N+1 through 3N are transferred to the input side of the routing engines 128 of the first, second and fourth broadcast router components 102, 104 and 108.

Finally, for the fourth broadcast router component 108, the input digital audio data streams 3N+1 through 4N are provided to the input side of the routing engine 128 directly. The input digital audio data streams 3N+1 through 4N input the transmission expansion port 148, on the other hand, is transferred to the third receiving expansion port 154 of the first broadcast router component 102 over the link 114, the second receiving expansion port 152 of the second broadcast router component 104 over the link 118 and the third receiving expansion port 154 of the third broadcast router component 108 over the link 120, respectively. From the third receiving expansion port 154 of the first broadcast router component 102, the second receiving expansion port 152 of the second broadcast router component 104 and the third receiving expansion port 154 of the fourth broadcast router component 108, the input digital audio data streams 3N+1 through 4N are transferred to the input side of the routing engines 128 of the first, second and fourth broadcast router components 102, 104 and 108. In this manner, the routing engine 128 of each one of the first, second, third and fourth broadcast router components 102, 104, 106 and 108 receive, at the input side thereof, the input digital audio data streams 1 through 4N. Further processing of the input digital audio streams 1 through 4N by the first, second, third and fourth broadcast router components 102, 104, 106 and 108 will then proceed in the manner hereinabove described with respect to FIG. 2.

Thus, there has been disclosed and illustrated herein a robust linearly expandable broadcast router which, by employing a fully connected topology between the plural broadcast router components forming the linearly expandable broadcast router, enjoys improved fault tolerance over prior linearly expandable broadcast routers using plural bus structures to interconnect the plural broadcast router components. While preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. A linearly expandable router, comprising:
a first routing engine having input and output sides;
a second routing engine having input and output sides;
a third routing engine having input and output sides;
a first discrete link, said first discrete link coupling said input side of said first routing engine to said input side of said second routing engine;
a second discrete link, said second discrete link coupling said input side of said first routing engine to said input side of said third routing engine; and
a third discrete link, said third discrete link coupling said input side of said second routing engine to said input side of said third routing engine;
wherein data flows in to the input sides of the first, second, and third routing engines and data flows out from the output sides of the first, second, and third routing engines,
wherein the linearly expandable router is expanded by adding an additional routing engine having an input and output sides and by linking the input side of the additional routing engine to the input sides of the first, second, and third routing engines,
wherein said first, second and third routing engines each have N inputs to said input side thereof and M outputs from said output side thereof, and
wherein said linearly expandable router formed from said first, second and third routing engines having 3N inputs and 3M outputs.

2. The apparatus of claim 1, wherein:
said first discrete link providing said N inputs to said first routing engine to said input side of said second routing engine as a first N additional inputs thereto and providing said N inputs to said second routing engine to said input side of said first routing engine as a first N additional inputs thereto;
said second discrete link providing said N inputs to said first routing engine to said input side of said third routing engine as a first N additional inputs thereto and providing said N inputs to said third routing engine to said input side of said first routing engine as a second N additional inputs thereto; and
said third discrete link providing said N inputs to said second routing engine to said input side of said third routing engine as a second N additional inputs thereto and providing said N inputs to said third routing engine to said input side of said second routing engine as a second N additional inputs thereto.

3. A linearly expandable router, comprising:
a first routing engine having input and output sides;
a second routing engine having input and output sides;
a third routing engine having input and output sides;
a fourth routing engine having input and output sides;
a first discrete link, said first discrete link coupling said input side of said first routing engine to said input side of said second routing engine;
a second discrete link, said second discrete link coupling said input side of said first routing engine to said input side of said third routing engine;
a third discrete link, said third discrete link coupling said input side of said second routing engine to said input side of said third routing engine;
a fourth discrete link, said fourth discrete link coupling said input side of said first routing engine to said input side of said fourth routing engine;
a fifth discrete link, said fifth discrete link coupling said input side of said second routing engine to said input side of said fourth routing engine; and
a sixth discrete link, said sixth discrete link coupling said input side of said third routing engine to said input side of said fourth routing engine:
wherein data flows in to the input sides of the first, second, and third routing engines and data flows out from the output sides of the first, second, and third routing engines,
wherein the linearly expandable router is expanded by adding an additional routing engine having an input and output sides and by linking the input side of the additional routing engine to the input sides of the first, second, and third routing engines,
wherein said first, second, third and fourth routing engines have N inputs to said input side and M outputs from said output side, and
wherein said linearly expandable router formed from said first, second, third and fourth routing engines having 4N inputs and 4M outputs.

4. The apparatus of claim 3, wherein:
said first discrete link providing said N inputs to said first routing engine to said input side of said second routing engine as a first N additional inputs thereto and providing said N inputs to said second routing engine to said Input side of said first routing engine as a first N additional inputs thereto;
said second discrete link providing said N inputs to said first routing engine to said input side of said third routing engine as a first N additional inputs thereto and providing said N inputs to said third routing engine to said input side of said first routing engine as a second N additional inputs thereto;

said third discrete link providing said N inputs to said first routing engine to said input side of said fourth routing engine as a first N additional inputs thereto and providing said N inputs to said fourth routing engine to said input side of said first routing engine as a third N additional inputs thereto;

said fourth discrete link proving said N inputs to said second routing engine to said input side of said third routing engine as a second N additional inputs thereto and providing said N inputs to said third routing engine to said input side of said second routing engine as a second N additional inputs thereto;

said fifth discrete link proving said N inputs to said second routing engine to said input side of said fourth routing engine as a second N additional inputs thereto and providing said N inputs to said fourth routing engine to said input side of said second routing engine as a third N additional inputs thereto; and said sixth discrete link proving said N inputs to said third routing engine to said input side of said fourth routing engine as a third N additional inputs thereto and providing said N inputs to said fourth routing engine to said input side of said third routing engine as a third N additional inputs thereto.

5. A linearly expandable broadcast router, comprising:

at least three broadcast router components, each of said at least three broadcast router components is a discrete router having an input side and an output side and including a routing engine coupled between said input and output sides; and means for coupling said at least three broadcast router components wherein said input side of each of said broadcast router component is connected, by a discrete link, to each and every one of the other said input sides of said broadcast router components;

wherein data flows in to the input sides of the first, second, and third broadcast router components and data flows out from the output sides of the first, second, and third broadcast router components, wherein the linearly expandable router is expanded by adding an additional broadcast router component having an input and output sides and by linking the input side of the additional broadcast router component to the input sides of the first, second, and third broadcast router components, wherein said input side of each of said at least three broadcast router components has N inputs and said output side of each of said at least three broadcast router components has M outputs, and wherein said coupling means further comprises means for coupling said N inputs for each one of said at least three broadcast router components to said routing engine for the other ones of said at least three broadcast router components.

6. A method of constructing a linearly expandable broadcast router, comprising:

providing first, second and third routers, each router having input and output sides and each router including a routing engine coupled between said input and output sides:

coupling, using a first discrete link, said input side of said first router to said input side of said second router;

coupling, using a second discrete link, said input side of said first router to said input side of said third router; and coupling, using a third discrete link, said input side of said second router to said input side of said third router;

wherein data flows in to the input sides of the first, second, and third routing engines and data flows out from the output sides of the first, second, and third routing engines, wherein the linearly expandable router is expanded by adding an additional routing engine having an input and output sides and by linking the input side of the additional routing engine to the input sides of the first, second, and third routing engines, wherein said first, second and third routing engines each have N inputs to said input side thereof and M outputs from said output side thereof, and wherein said linearly expandable router formed from said first, second and third routing engines having 3N inputs and 3M outputs.

7. The method of claim 6, and further comprising:

providing a fourth router having input and output sides;

coupling, using a fourth discrete link, said input side of said first router to said input side of said fourth router;

coupling, using a fifth discrete link, said input side of said second router to said input side of said fourth router; and coupling, using a sixth discrete link, said input side of said third router to said input side of said fourth router.

* * * * *